3,824,247
2-(1,3,3-TRIMETHYLUREIDO)-1,3,4-THIADIAZOLE-5-N,N-DIMETHYLSULFONAMIDE

William C. Doyle, Jr., Leawood, and Loren W. Hedrich, Overland Park, Kans., assignors to Gulf Research & Development Company, Pittsburgh, Pa.
No Drawing. Continuation-in-part of application Ser. No. 119,417, Feb. 26, 1971. This application Sept. 1, 1971, Ser. No. 177,178
Int. Cl. C07d 91/62
U.S. Cl. 260—306.8 D                    1 Claim

ABSTRACT OF THE DISCLOSURE

The industrial herbicide 5 - (1,3,3 - trimethylureido)-N,N - dimethyl - 1,3,4 - thiadiazole - 2-sulfonamide and other compounds of similar structure may be made by a novel procedure in which the first step is the oxidative chlorination of a 2-alkylamino-5-mercapto-1,3,4-thiadiazole to yield the corresponding sulfonyl chloride. The subject compound which possesses five methyl substituent groups is more effective as a herbicide than compounds which contain other alkyl substituents or a lesser number of methyl substituents.

---

This application is a coninuation-in-part of U.S. Ser. No. 119,417 filed Feb. 26, 1971. The disclosure of the aforementioned application is incorporated herein by reference.

DESCRIPTION OF THE INVENTION

U.S. Ser. No. 119,417 which is incorporated herein by reference discloses a new class of highly phytotoxic substances which may be applied to the locus of unwanted vegetation to effect control, either pre- or post-emergently. Effective compounds have the structural formula:

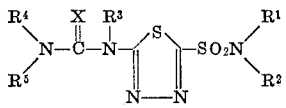

in which $R^1$ and $R^2$ are selected from hydrogen, lower cycloalkyl, lower alkyl, alkoxy, cyanoalkyl, aralkyl, alkoxyalkyl, alkylaminoalkyl, lower alkenyl and lower alkynyl substutients and heterocyclic structures in which $R^1$ and $R^2$ are together alkylene or oxyalkylene with two to five carbon atoms, $R^3$ is hydrogen, methyl or ethyl, $R^4$ is hydrogen or lower alkyl, $R^5$ is selected from lower alkyl, lower alkenyl and lower cycloalkyl substituents and X is oxygen or sulfur.

In the aforementioned application many specific compounds of the class are disclosed having a high degree of phytotoxicity and varied selectivity. It has been discovered that one of the compounds of this class, 5-(1,3,3-trimethylureido) - N,N - dimethyl - 1,3,4 - thiadiazole-2-sulfonamide, is an unusually effective herbicide of the type which is used industrially to prevent growth of weeds in railroad right-of-ways and in other areas where uncontrolled growth of vegetation is undesirable. In the aforementioned application, methods of synthesis of the new herbicides are also disclosed. A new, more direct method of synthesis of this class of herbicides has been discovered in which it has been found unnecessary to protect a free amino substituent on the thiadiazole nucleus during oxidative chlorination. The method of synthesis of the class of herbicides and use of a superior member of the class to control a large number of species of plant life are specifically exemplified below.

Herbicide Synthesis

On the basis of disclosures in the chemical literature, particularly Roblin and Clapp, (J. Am. Chem. Soc. 72 4890 (1950)), the presence of a free amine function on the thiadiazole molecule precludes the conversion of the mercapto group to the corresponding sulfonyl chloride by oxidative chlorination. Oxidative chlorination is a well known technique, most conveniently operated by introducing chlorine into dilute aqueous hydrochloric acid reaction medium at room temperature or below, with the substance to be clorinated present in solution or suspension. (See, for example, the publication by Petrow et al. J. Chem. Soc. 198, p. 1508). Amines are known to interfere with the reaction. Consequently a preferred approach to synthesis of the desired class of compounds has involved protection of the free amine group prior to oxidative chlorination, as shown below in the synthesis scheme which was disclosed in U.S. Ser. No. 119,417:

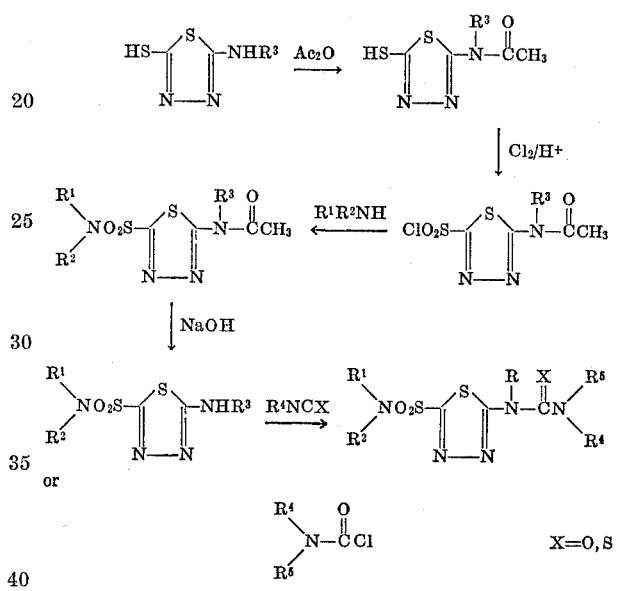

We have discovered, however, that protection of the amino substituent on the thiadiazole nucleus is unnecessary in the formation of the corresponding sulfonyl chloride by oxidative chlorination of the mercapto substituent. As a result of this discovery, herbicides of this class have now been synthesized by means of a more convenient and direct method, which consists of the following steps performed in sequence:

(a) Chlorinating under oxidizing conditions an amine having the structural formula

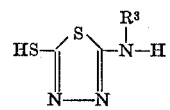

in which $R^3$ may be methyl or ethyl to yield a corresponding sulfonyl chloride having the structural formula

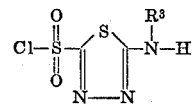

(b) reacting the sulfonyl chloride produced in step (a) with a secondary amine of the structural formula

in which $R^1$ may be hydrogen or lower alkyl and $R^2$ may be hydrogen or lower alkyl or $R^1$ and $R^2$ together form a ring with the nitrogen atom to yield a sulfonamide having the structural formula

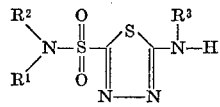

(c) reacting the sulfonamide produced in step (b) with a carbamyl chloride or isocyanate having one of the structural formulae

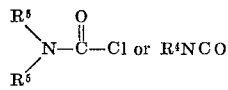

or preferably reacting the amine substituent with phosgene in inert solvent followed by reacting the resulting carbamyl chloride with an amine having the structural formula

in which $R^4$ may be lower alkyl, preferably methyl and $R^5$ may be hydrogen or lower alkyl to yield a phytotoxic ureidothiadiazolesulfonamide having the structural formula:

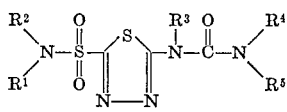

More specifically, the route to a superior industrial type herbicide composition is shown in the following scheme, in which alternate methods of carbamylation are outlined.

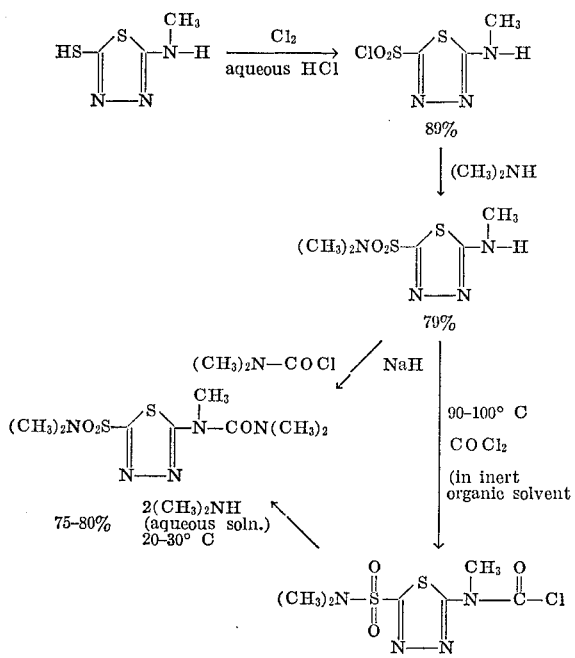

The synthesis of this compound is specifically exemplified as follows:

Preparation of 2-Methylamino-5-chlorosulfonyl-1,3,4-thiadiazole

A rapid stream of chlorine is passed into a well stirred slurry of 55.0 g. (0.374 mols) of 2-methylamino-5-mercapto-1,3,4-thiadiazole in 1800 ml. of 10% hydrochloric acid. While maintaining the temperature at 0° to (—10°) by cooling in an ice-salt bath, the chlorine addition is continued until no more chlorine is absorbed and the reaction mixture has a definite yellow color. Filtration of the solid and thorough washing with water gives 71.2 g. of 2-methylamino-5-chlorosulfonyl-1,3,4-thiadiazole, m.p. 87° (dec.).

Analysis.—Calc'd: C, 31.80; H, 4.58; N, 21.19. Found: C, 31.59; H, 4.45; N, 21.44.

Preparation of 2-Methylamino-1,3,4-thiadiazole-5-N,N-dimethylsulfonamide

To a solution of 24.0 g. (0.133 mols) of 25% aqueous dimethylamine in 70 ml. dioxane is added slowly 2-methylamino - 5 - chlorosulfonyl - 1,3,4-thiadiazole (the damp filter cake from oxidative chlorination of 9.5 g., 0.0645 mols, of 2-methylamino-5-mercapto-1,3,4-thiadiazole) while stirring in an ice bath. After an additional 1 to 2 hours stirring, the mixture is diluted 3- to 4-fold with water, filtered and the crystilline product washed with water. The 2 - methylamino - 1,3,4-thiadiazole-5-N,N-dimethylsulfonamide (70% overall yield from I) melts at 168–70°.

Analysis.—Calc'd: C, 27.00; H, 4.50; N, 25.25. Found: C, 26.79; H, 4.51; N, 25.13.

Preparation of 2-Ethylamino-1,3,4-thiadiazole-5-N-ethylsulfonamide

Repeating the above procedure and reacting the damp filter cake (the dry product is unstable) from oxidative chlorination of 25.0 g. of 2-ethylamino-5-mercapto-1,3,4-thiadiazole with 19.0 g. of 70% aqueous ethylamine in 100 ml. of dioxane gave 17.9 g. of 2-ethylamino-1,3,4-thiadiazole-5-N-ethylsulfonamide, m.p. 137–9°.

Preparation of 2-(1,1,3-Trimethylureido)-1,3,4-thiadiazole-5-N,N-dimethylsulfonamide To a solution of 42.0 g. (0.19 mols) of 2-methylamino-1,3,4-thiadiazole-5 - N,N - dimethylsulfonamide in 225 ml. of dimethylformamide is added, with ice-bath cooling, 10.2 g. of a 57% oil dispersion of sodium hydride. After stirring 30 minutes at room temperature 20.4 g. (0.19 mole) of N,N-dimethylcarbamyl chloride is added slowly, without cooling, with the reaction temperature rising to about 55°. The mixture is then heated to 90° for 3 hours, vacuum stripped, and the residue partitioned between benzene and water. The benzene layer is separated, evaporated and the residue is triturated with hexane to give 43 g. of 2-(1,3,3-trimethylureido)-1,3,4-thiadiazole-5-N,N-dimethylsulfonamide, m.p. 103–5°.

The following method, based on simple, cheap raw materials is preferred for conversion of the amino-substituted thiadiazolesulfonamide to the corresponding ureido substituted compound.

Reaction of 2-Methylamino-1,3,4-thiadiazole-5,N,N-dimethylsulfonamide with Phosgene, and Dimethylamine Phosgene is bubbled into a well stirred slurry of 10.0 g. of 2-methylamino-1,3,4-thiadiazole-5-N,N-dimethylsulfonamide and 100 ml. of dry toluene heated to 90–100°. The solid starting material slowly dissolves and the phosgene addition is continued 30 minutes after a clear solution results. While maintaining the temperature at 90–100° a rapid stream of nitrogen is passed through the solution for one hour to remove the excess phosgene. The toluene solution is filtered to remove a trace of gummy precipitate, cooled to 20–25° and 12.0 g. of 40% aqueous dimethylamine is added slowly, keeping the temperature below 30°. The mixture is then heated to 50–60° for 30 minutes, cooled, washed with two 100 ml. portions of water and the toluene is removed under vacuum. The crystalline residue is slurried with hexane and filtered to give 10.0 g. (76% yield) of 2-(1,3,3-dimethylureido)-1,3,4 - thiadiazole - 5 - N,N-dimethylsulfonamide, m.p. 101–5°.

Carrying out the reaction in the same way, except that the 2- methylamino - 1,3,4 - thiadiazole-5-N,N-dimethylsulfonamide was first converted to the hydrochloride in a stream of anhydrous hydrogen chloride gave a 78% yield of product, m.p. 101–2°.

Specific compounds which are illustrative of the class of herbicides which may be manufactured by the improved method of this invention are listed in Table I.

data are given. Compound No. 11 did not show a significant effect in either the pre- or post-emergency tests at either 1 lb. or 3 lb. per acre.

TABLE I

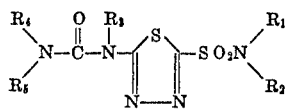

| Compound number | Number of CH₃ groups | R¹ | R² | R³ | R⁴ | R⁵ | Melting point, ° C. |
|---|---|---|---|---|---|---|---|
| 1 | 1 | H | H | H | H | CH₃ | >310. |
| 2 | 2 | H | CH₃ | H | H | CH₃ | 227–228. |
| 3 | 3 | H | CH₃ | CH₃ | H | CH₃ | 158–160. |
| 4 | 3 | CH₃ | CH₃ | H | H | CH₃ | 193–196. |
| 5 | 4 | CH₃ | CH₃ | CH₃ | H | CH₃ | 211–214. |
| 6 | 5 | CH₃ | CH₃ | CH₃ | CH₃ | CH₃ | 103–105. |
| 7 | 0 | C₂H₅ | C₂H₅ | C₂H₅ | C₂H₅ | C₂H₅ | (Liquid) B.P. 203–205°/0.3mm. 253–20 Hg. |
| 8 | 1 | H | CH₂=CHCH₂ | H | H | CH₃ | 193–194.5. |
| 9 | 1 | H | n-C₄H₉ | H | H | CH₃ | 183–185. |
| 10 | 1 | H | t-C₄H₉ | H | H | CH₃ | 245–246 (decomp). |
| 11 | 3 | CH₃O | CH₃ | CH₃ | H | CH₃ | 216.5–217. |
| 12 | 1 | —CH₂CH₂OCH₂CH₂— | | H | H | CH₃ | 229–230. |

Combating Unwanted Vegetation

The novel herbicides are effective when used both post- and pre-emergently. There is described below an illustrative procedure for herbicidal use of the compounds under controlled conditions in the greenhouse so as to obtain data on phytotoxic acivity and selectivity.

(1) Post-Emergent Use

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The 24 species of plants on which each compound was to be tested were planted in disposable plastic pots in a greenhouse. Ten to eighteen days after emergence of the plants, three pots of each species were sprayed at each rate with an aqueous dispersion of the active compound prepared as described above, at rates of both 1 lb. and 3 lb. of active compound per acre and at a spray volume of 60 gallons per acre. Approximately one week after the spray application the plants were observed and the results rated according to the following schedule.

DEGREE OF EFFECT

0 = no effect
1 = slight effect
2 = moderate effect
3 = severe effect
4 = maximum effect (all plants died)

The same rating schedule was employed to judge pre-emergent results obtained according to the procedure below.

(2) Pre-Emergent Use

A solution of each active compound was prepared by dissolving 290 mg. of the compound to be tested in 200 ml. of acetone. Disposable paper trays about 2½ inches deep were filled with soil and sprayed with the acetone solution at rates of 3 lb. and 1 lb. of active chemical per acre of sprayed area, were seeded with 24 species of plant seeds and were then covered with about ¼ inch of soil. Twenty-one days after seeding and treatment the plantings were examined and herbicidal effect was rated according to the above schedule.

Both post-emergent and pre-emergent results are set forth in Table II. Compound No. 1 did not show a significant herbicidal effect in the pre-emergence test and no

TABLE II

Compound number 1

| Plant species | Mode of application—Post | |
|---|---|---|
| | 3 lb./acre | 1 lb./acre |
| Cocklebur | 1 | 0 |
| Lambsquarter | 1 | 0 |
| Morning glory | 1 | 0 |
| Pigweed | 1 | 0 |
| Wild buckwheat | 2 | 0 |
| Wild mustard | 1 | 0 |
| Barnyard grass | 0 | 0 |
| Crabgrass | 0 | 0 |
| Downy brome | 0 | 0 |
| Giant Foxtail | 0 | 0 |
| Green foxtail | 0 | 0 |
| Nutsedge | 0 | 0 |
| Shattercane | 0 | 0 |
| Wild oats | 0 | 0 |
| Alfalfa | 0 | 0 |
| Cotton | 1 | 0 |
| Peanut | 0 | 0 |
| Soybean | 1 | 0 |
| Sugar beets | 1 | 0 |
| Tomato | 1 | 0 |
| Corn | 0 | 0 |
| Grain sorghum | 0 | 0 |
| Rice | 0 | 0 |
| Wheat | 0 | 0 |

| Plant species | Mode of application | | | |
|---|---|---|---|---|
| | Pre | | Post | |
| | 3 lb./acre | 1 lb./acre | 3 lb./acre | 1 lb./acre |
| | Compound number 2 | | | |
| Cocklebur | 0 | 0 | X | X |
| Lambsquarter | 4 | 1 | 4 | 4 |
| Morning glory | 0 | 0 | 1 | 1 |
| Pigweed | 4 | 3 | 4 | 4 |
| Wild buckwheat | 2 | 0 | 4 | 4 |
| Wild mustard | 4 | 1 | 4 | 4 |
| Barnyard grass | 4 | 3 | 4 | 4 |
| Crabgrass | 4 | 3 | 4 | 4 |
| Downy brome | 3 | 0 | 3 | 1 |
| Giant foxtail | 4 | 2 | 4 | 4 |
| Green foxtail | 4 | 2 | 4 | 4 |
| Nutsedge | 0 | 0 | 0 | 0 |
| Shattercane | 4 | 3 | 4 | 3 |
| Wild Oats | 3 | 1 | 4 | 4 |
| Alfalfa | 3 | 1 | 4 | 4 |
| Cotton | 0 | 0 | 4 | 4 |
| Peanut | 0 | 0 | 2 | 1 |
| Soybean | 0 | 0 | 4 | 2 |
| Sugar beets | 1 | 0 | 4 | 4 |
| Tomato | 4 | 1 | 4 | 4 |
| Corn | 3 | 2 | 2 | 1 |
| Grain sorghum | 4 | 2 | 4 | 3 |
| Rice | 4 | 3 | 4 | 3 |
| Wheat | 4 | 3 | 4 | 4 |
| Cocklebur | 4 | 4 | 4 | 3 |
| Lambsquarter | 4 | 4 | 4 | 4 |
| Morning glory | 4 | 4 | 4 | 4 |
| Pigweed | 4 | 4 | 4 | 4 |
| Wild buckwheat | 4 | 4 | 4 | 4 |
| Wild mustard | 4 | 4 | 4 | 4 |
| Barnyard grass | 4 | 4 | 4 | 2 |
| Crabgrass | 4 | 4 | 4 | 3 |
| Downy brome | 4 | 4 | 4 | 1 |
| Giant foxtail | 4 | 4 | 4 | 2 |

See footnotes at end of table.

TABLE II.—Continued

| Plant species | Mode of application | | | |
|---|---|---|---|---|
| | Pre | | Post | |
| | 3 lb./acre | 1 lb./acre | 3 lb./acre | 1 lb./acre |
| *Compound number 2* | | | | |
| Green foxtail | 4 | 3 | 4 | 3 |
| Nutsedge | 3 | 0 | 0 | 0 |
| Shattercane | 4 | 4 | 4 | 1 |
| Wild Oats | 4 | 4 | 4 | 3 |
| Alfalfa | 4 | 3 | 4 | 4 |
| Cotton | 4 | 3 | 4 | 4 |
| Peanut | 3 | 1 | 4 | 2 |
| Soybean | 4 | 4 | 4 | 4 |
| Sugar beets | 4 | 4 | 4 | 4 |
| Tomato | 4 | 4 | 4 | 4 |
| Corn | 4 | 2 | 1 | 0 |
| Grain sorghum | 4 | 4 | 2 | 1 |
| Rice | 4 | 4 | 4 | 2 |
| Wheat | 4 | 4 | 4 | 3 |
| *Compound number 4* | | | | |
| Cocklebur | 4 | 1 | 4 | 4 |
| Lambsquarter | 4 | 4 | 4 | 4 |
| Morning glory | 4 | 0 | 4 | 4 |
| Pigweed | 4 | 4 | 4 | 1 |
| Wild buckwheat | 4 | 1 | 4 | 4 |
| Wild mustard | 4 | 4 | 4 | 4 |
| Barnyard grass | 4 | 4 | 4 | 4 |
| Crabgrass | 4 | 4 | 4 | 4 |
| Downy brome | 4 | 4 | 4 | 1 |
| Giant foxtail | 4 | 4 | 4 | 4 |
| Green foxtail | 4 | 4 | 4 | 4 |
| Nutsedge | 3 | 0 | 0 | 0 |
| Shattercane | 4 | 4 | 4 | 1 |
| Wild oats | 4 | 4 | 4 | 2 |
| Alfalfa | 4 | 4 | 4 | 4 |
| Cotton | 4 | 1 | 4 | 3 |
| Peanut | 2 | 0 | 3 | 1 |
| Soybean | 4 | 4 | 3 | 1 |
| Sugar beets | 4 | 4 | 4 | 4 |
| Tomato | 4 | 4 | 4 | 4 |
| Corn | 4 | 4 | 1 | 0 |
| Grain sorghum | 4 | 4 | 3 | 1 |
| Rice | 4 | 4 | 4 | 2 |
| Wheat | 4 | 4 | 4 | 2 |
| *Compound number 5* | | | | |
| Cocklebur | 4 | 4 | 3 | 1 |
| Lambsquarter | 4 | 4 | 4 | 4 |
| Morning glory | 4 | 4 | 4 | 4 |
| Pigweed | 4 | 4 | 4 | 4 |
| Wild buckwheat | 4 | 4 | 4 | 4 |
| Wild mustard | 4 | 4 | 4 | 4 |
| Barnyard grass | 4 | 4 | 4 | 3 |
| Crabgrass | 4 | 4 | 4 | 4 |
| Downy brome | 4 | 4 | 4 | 1 |
| Giant foxtail | 4 | 4 | 4 | 2 |
| Green foxtail | 4 | 4 | 4 | 4 |
| Nutsedge | 4 | 2 | 0 | 0 |
| Shattercane | 4 | 4 | 4 | 1 |
| Wild oats | 4 | 4 | 4 | 4 |
| Alfalfa | 4 | 4 | 4 | 4 |
| Cotton | 4 | 4 | 4 | 4 |
| Peanut | 4 | 3 | 3 | 1 |
| Soybean | 4 | 4 | 4 | 4 |
| Sugar beets | 4 | 4 | 4 | 4 |
| Tomato | 4 | 4 | 4 | 4 |
| Corn | 4 | 4 | 3 | 0 |
| Grain sorghum | 4 | 4 | 3 | 0 |
| Rice | 4 | 4 | 4 | 4 |
| Wheat | 4 | 4 | 4 | 4 |
| *Compound number 6* | | | | |
| Cocklebur | 4 | 4 | 4 | 4 |
| Lambsquarter | 4 | 4 | 4 | 4 |
| Morning glory | 4 | 4 | 4 | 4 |
| Pigweed | 4 | 4 | 4 | 4 |
| Wild buckwheat | 4 | 4 | 4 | 4 |
| Wild mustard | 4 | 4 | 4 | 4 |
| Barnyard grass | 4 | 4 | 4 | 3 |
| Crabgrass | 4 | 4 | 4 | 2 |
| Downy brome | 4 | 4 | 4 | 4 |
| Giant foxtail | 4 | 4 | 4 | 3 |
| Green foxtail | 4 | 4 | 4 | 4 |
| Nutsedge | ¹3 | ¹3 | 2 | 0 |
| Shattercane | 4 | 4 | 4 | 3 |
| Wild oats | 4 | 4 | 4 | 4 |
| Alfalfa | 4 | 4 | 4 | 4 |
| Cotton | 4 | 4 | 4 | 4 |
| Peanut | 4 | 3 | 4 | 4 |
| Soybean | 4 | 4 | 4 | 4 |
| Sugar beets | 4 | 4 | 4 | 4 |
| Tomato | 4 | 4 | 4 | 4 |
| Corn | 4 | 4 | 4 | 3 |
| Grain sorghum | 4 | 4 | 4 | 3 |
| Rice | 4 | 4 | 4 | 4 |
| Wheat | 4 | 4 | 4 | 4 |
| *Compound number 7* | | | | |
| Cocklebur | 0 | 0 | 0 | 0 |
| Lambsquarter | 3 | 3 | 2 | 0 |
| Morning glory | 1 | 0 | 1 | 0 |
| Pigweed | 4 | 3 | 0 | 0 |
| Wild buckwheat | 1 | 0 | 1 | 0 |
| Wild mustard | 3 | 3 | 2 | 0 |
| Barnyard grass | 2 | 0 | 0 | 0 |
| Crabgrass | 4 | 1 | 0 | 0 |
| Downy brome | 1 | 0 | 0 | 0 |
| Giant foxtail | 1 | 0 | 0 | 0 |
| Green foxtail | 0 | 0 | 0 | 0 |
| Nutsedge | 0 | 0 | 0 | 0 |
| Shattercane | 0 | 0 | 0 | 0 |
| Wild oats | 1 | 0 | 0 | 0 |
| Alfalfa | 1 | 0 | 1 | 0 |
| Cotton | 0 | 0 | 1 | 0 |
| Peanut | 0 | 0 | 0 | 0 |
| Soybean | 0 | 0 | 1 | 0 |
| Sugar beets | 3 | 1 | 1 | 0 |
| Tomato | 3 | 1 | 1 | 0 |
| Corn | 0 | 0 | 0 | 0 |
| Grain sorghum | 0 | 0 | 0 | 0 |
| Rice | 0 | 0 | 0 | 0 |
| Wheat | 1 | 0 | 0 | 0 |
| *Compound number 8* | | | | |
| Cocklebur | X | X | X | X |
| Lambsquarter | 4 | 4 | 4 | 4 |
| Morning glory | 0 | 0 | 1 | 1 |
| Pigweed | 4 | 4 | 4 | 4 |
| Wild buckwheat | 2 | 1 | 4 | 4 |
| Wild mustard | 3 | 0 | 4 | 4 |
| Barnyard grass | 4 | 3 | 4 | 1 |
| Crabgrass | 4 | 3 | 4 | 3 |
| Downy brome | 4 | 3 | 3 | 1 |
| Giant foxtail | 4 | 3 | 4 | 2 |
| Green foxtail | 3 | 1 | 4 | 1 |
| Nutsedge | 0 | 0 | 0 | 0 |
| Shattercane | 3 | 1 | 2 | 0 |
| Wild oats | 4 | 2 | 3 | 1 |
| Alfalfa | 1 | 0 | 3 | 2 |
| Cotton | 0 | 0 | 3 | 1 |
| Peanut | 0 | 0 | 1 | 0 |
| Soybean | 2 | 0 | 2 | 2 |
| Sugar beets | 4 | 1 | 4 | 3 |
| Tomato | 4 | 3 | 4 | 4 |
| Corn | 4 | 1 | 2 | 1 |
| Grain sorghum | 3 | 1 | 2 | 0 |
| Rice | 4 | 3 | 3 | 1 |
| Wheat | 4 | 4 | 3 | 1 |
| *Compound number 9* | | | | |
| Cocklebur | X | X | X | X |
| Lambsquarter | 4 | 4 | 4 | 4 |
| Morning glory | 0 | 0 | 2 | 1 |
| Pigweed | 4 | 4 | 4 | 4 |
| Wild buckwheat | 1 | 0 | 4 | 3 |
| Wild mustard | 4 | 0 | 4 | 4 |
| Barnyard grass | 3 | 2 | 3 | 3 |
| Crabgrass | 3 | 3 | 4 | 3 |
| Downy brome | 3 | 1 | 2 | 1 |
| Giant foxtail | 3 | 2 | 3 | 2 |
| Green foxtail | 2 | 1 | 4 | 2 |
| Nutsedge | 0 | 0 | 0 | 0 |
| Shattercane | 1 | 0 | 2 | 0 |
| Wild oats | 3 | 2 | 3 | 1 |
| Alfalfa | 1 | 0 | 4 | 3 |
| Cotton | 0 | 0 | 3 | 0 |
| Peanut | 0 | 0 | 1 | 0 |
| Soybean | 1 | 0 | 3 | 3 |
| Sugar beets | 4 | 1 | 4 | 3 |
| Tomato | 4 | 0 | 4 | 4 |
| Corn | 1 | 0 | 2 | 0 |
| Grain sorghum | 1 | 0 | 2 | 0 |
| Rice | 3 | 2 | 2 | 1 |
| Wheat | 4 | 3 | 2 | 1 |
| *Compound number 10* | | | | |
| Cocklebur | X | X | X | X |
| Lambsquarter | 3 | 1 | 1 | 0 |
| Morning glory | 0 | 0 | 0 | 0 |
| Pigweed | 4 | 2 | 1 | 0 |
| Wild buckwheat | 0 | 0 | 1 | 0 |
| Wild mustard | 0 | 0 | 2 | 0 |
| Barnyard grass | 2 | 0 | 0 | 0 |
| Crabgrass | 3 | 0 | 0 | 0 |
| Downy brome | 1 | 0 | 0 | 0 |
| Giant foxtail | 2 | 0 | 0 | 0 |
| Green foxtail | 1 | 0 | 0 | 0 |
| Nutsedge | 0 | 0 | 0 | 0 |
| Shattercane | 0 | 0 | 0 | 0 |
| Wild oats | 0 | 0 | 0 | 0 |
| Alfalfa | 0 | 0 | 0 | 0 |
| Cotton | 0 | 0 | 0 | 0 |
| Peanut | 0 | 0 | 0 | 0 |
| Soybean | 0 | 0 | 1 | 1 |
| Sugar beets | 4 | 0 | 2 | 1 |
| Tomato | 1 | 1 | 2 | 1 |
| Corn | 0 | 0 | 0 | 0 |
| Grain sorghum | 0 | 0 | 0 | 0 |
| Rice | 1 | 0 | 0 | 0 |
| Wheat | 1 | 0 | 0 | 0 |

See footnotes at end of table.

TABLE II.—Continued

| Plant species | Mode of application | | | |
|---|---|---|---|---|
| | Pre | | Post | |
| | 3 lb./acre | 1 lb./acre | 3 lb./acre | 1 lb./acre |
| | Compound number 12 | | | |
| Cocklebur | 0 | 0 | 2 | 1 |
| Lambsquarter | 4 | 4 | 4 | 3 |
| Morning glory | 1 | 0 | 2 | 1 |
| Pigweed | 4 | 4 | 4 | 4 |
| Wild buckwheat | 0 | 0 | 4 | 3 |
| Wild mustard | 1 | 0 | 4 | 3 |
| Barnyard grass | 4 | 3 | 2 | 0 |
| Crabgrass | 4 | 1 | 4 | 1 |
| Downy brome | 4 | 0 | 2 | 0 |
| Giant foxtail | 4 | 1 | 3 | 0 |
| Green foxtail | 4 | 4 | 4 | 3 |
| Nutsedge | 0 | 0 | 0 | 0 |
| Shattercane | 4 | 2 | 0 | 0 |
| Wild oats | 4 | 4 | 1 | 0 |
| Alfalfa | 4 | 4 | 4 | 4 |
| Cotton | 1 | 0 | 4 | 4 |
| Peanut | 0 | 0 | 1 | 1 |
| Soybean | 0 | 0 | 3 | 1 |
| Sugar beets | 4 | 1 | 4 | 4 |
| Tomato | 4 | 3 | 4 | 4 |
| Corn | 2 | 1 | 0 | 0 |
| Grain sorghum | 4 | 2 | 0 | 0 |
| Rice | 4 | 4 | 1 | 0 |
| Wheat | 4 | 4 | 2 | 1 |

[1] All plants died in about 1 to 2 additional weeks.

NOTE.—0=no injury; 4=complete kill.

The relative effectiveness of twelve compounds having various combinations of substituents on 24 plant species was summarized by adding the scores at both application levels of one pound per acre and three pounds per acre and comparing the totals. The comparative results appear in the following table from which it is clearly apparent that the compound 5 - (1,3,3 - trimethylureido) - N,N-dimethyl - 1,3,4 - thiadiazole - 2 - sulfonamide out-performed all of the compounds which contained a lesser number of methyl substituent groups.

TABLE IV.—Comparison of preemergent effectiveness at ¼ lb. per acre

| Plant species | Compound number— | |
|---|---|---|
| | 5 | 6 |
| Pigweed | 3 | 4 |
| Lambsquarter | 4 | 4 |
| Crabgrass | 1 | 4 |
| Downy brome | 1 | 4 |
| Giant foxtail | 1 | 4 |
| Nutsedge | 0 | 0 |
| Peanut | 0 | 0 |
| Cotton | 0 | 4 |
| Tomato | 3 | 4 |
| Sugar beet | 0 | 4 |
| Wild buckwheat | 0 | 4 |
| Wild mustard | 2 | 4 |
| Cocklebur | 1 | 4 |
| Morning glory | 1 | 4 |
| Soybean | 1 | 4 |
| Barnyard grass | 1 | 4 |
| Green foxtail | 1 | 4 |
| Alfalfa | 0 | 4 |
| Corn | 0 | 2 |
| Grain sorghum | 1 | 3 |
| Shattercane | 1 | 4 |
| Wheat | 2 | 4 |
| Wild oats | 1 | 4 |
| Rice | 4 | 4 |

What is claimed is:
1. The herbicidal compound having the structural formula

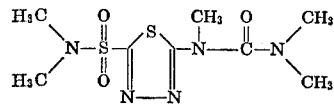

TABLE III

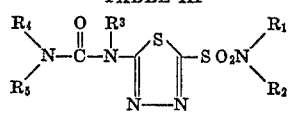

| Compound No.: | Number of CH₃ groups | R¹ | R² | R³ | R⁴ | R⁵ | Pre | | Post | | Σ (total) |
|---|---|---|---|---|---|---|---|---|---|---|---|
| | | | | | | | Σ3 lb./acre | Σ1 lb./acre | Σ3 lb./acre | Σ1 lb./acre | |
| 1 | 1 | H | H | H | H | CH₃ | | | 11 | 0 | 11 |
| 2 | 2 | H | CH₃ | H | H | CH₃ | 63 | 31 | 80 | 71 | 245 |
| 3 | 3 | H | CH₃ | CH₃ | H | CH₃ | 94 | 84 | 87 | 66 | 331 |
| 4 | 3 | CH₃ | CH₃ | H | H | CH₃ | 93 | 75 | 86 | 63 | 317 |
| 5 | 4 | CH₃ | CH₃ | CH₃ | H | CH₃ | 96 | 93 | 88 | 69 | 346 |
| 6 | 5 | CH₃ | CH₃ | CH₃ | CH₃ | CH₃ | 95 | 94 | 94 | 89 | 372 |
| 7 | 0 | C₂H₅ | C₂H₅ | C₂H₅ | C₂H₅ | C₂H₅ | 29 | 12 | 11 | 0 | 52 |
| 8 | 1 | H | CH₂=CHCH₂ | H | H | CH₃ | 65 | 38 | 68 | 41 | 212 |
| 9 | 1 | H | n-C₄H₉ | H | H | CH₃ | 50 | 25 | 66 | 43 | 184 |
| 10 | 1 | H | t-C₄H₉ | H | H | CH₃ | 23 | 4 | 10 | 3 | 40 |
| 11 | 3 | CH₃O | CH₃ | CH₃ | H | CH₃ | [1] 7 | | [2] 2 | | <12 |
| 12 | 1 | —CH₂CH₂OCH₂CH₂— | | H | H | CH₃ | 65 | 42 | 59 | 38 | 204 |
| Perfect score | | | | | | | 96 | 96 | 96 | 96 | 384 |

[1] A+10 lb./acre.
[2] A+5 lb./acre.

In the total scores tabulated above, compound No. 5 appears to also be fairly effective. However, over a period of several months the weed control obtained with compound No. 6 appears to remain nearly complete, while with compound No. 5 there is a resurgence of weed growth. The reason becomes apparent when the two compounds are tested at lower application rates. Results obtained by comparing the two compounds at an application rate of ¼ lb. per acre appear in Table IV. It is evident from these results that as the concentration of herbicide in the soil decreases, compound No. 5 becomes ineffective, while compound No. 6 continued to give complete control of a number of species.

References Cited

UNITED STATES PATENTS 2,820,794  1/1958  Young et al. _____ 260—306.8 D
3,726,892  4/1973  Cebalo _____ 260—306.8 D

FOREIGN PATENTS 2,050,979  4/1971  Germany.

OTHER REFERENCES

Cebalo, Chem. Abstracts, 75:49094w (1971).

R. GALLAGHER, Primary Examiner

U.S. Cl. X.R.

71—90; 260—247.1